US007295533B2

(12) United States Patent
Alicherry et al.

(10) Patent No.: US 7,295,533 B2
(45) Date of Patent: Nov. 13, 2007

(54) METHOD FOR LOCATION TRACKING USING VICINITIES

(75) Inventors: Mansoor Ali Khan Alicherry, Scotch Plains, NJ (US); Harsha S Nagesh, Berkeley Heights, NJ (US); Chitra A Phadke, Basking Ridge, NJ (US); Viswanath Poosala, Middlesex, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 660 days.

(21) Appl. No.: 10/795,606

(22) Filed: Mar. 8, 2004

(65) Prior Publication Data

US 2005/0195761 A1 Sep. 8, 2005

(51) Int. Cl.
*H04Q 7/00* (2006.01)
(52) U.S. Cl. .................... 370/328; 370/338; 455/456.2
(58) Field of Classification Search ................. 370/328; 455/450, 456.1–456.6; 370/331, 338
See application file for complete search history.

(56) References Cited

U.S. PATENT DOCUMENTS

2003/0134647 A1* 7/2003 Santhoff et al. ............ 455/456
2005/0233748 A1* 10/2005 Robinson et al. ........... 455/440

OTHER PUBLICATIONS

Niculescu, D., Nath, B., *Ad Hoc Positioning System (APS) Using AOA*, DATAMAN Lab, Rutgers University, Piscataway, NJ.
Niculescu, D., Nath, B., *Ad Hoc Positioning System (APS)*, Computer Science Department, Rutgers University, Piscataway, NJ.
Li, J., Jannotti, J., De Couto, D.S.J., Karger, D. R., Morris, R., *A Scalable Location Service for Geographic Ad Hoc Routing*, MIT Laboratory for Computer Science.
Doherty, L., *Algorithms for Position and Data Recovery in Wireless Sensor Networks*, Research Project Submitted to the Department of Electrical Engineering and Computer Sciences, Univ. of California at Berkeley in partial satisfaction of the requirements for the degree of Master of Science, Plan II.
Haartsen, J. C., Ericsson Radio Systems B.V., *The Bluetooth Radio System*, IEEE Personal Communications, Feb. 2000, pp. 6-14.
Cheng, C.T., Institute for Math & its Applications, Minneapolis, MN, Lemberg, H.L., Telcordia Technologies, Morristown, NJ, Philip, S. J., van den Berg, E., Zhang, T., Department of CSE, University of Buffalo, Buffalo, NY, *SLALoM: A Scalable Location Management Scheme for Large Mobile Ad-hoc Networks*.
Bahl, P., Padmanabhan, V. N., *RADAR: An In-Building RF-based User Location and Tracking System*, Microsoft Research.
Rappaport, T. S., Reed, J. H., Woerner, B.D., Virginia Polytechnic Institute & State University, *Position Location Using Wireless Communications on Highways of the Future*, IEEE Communications Magazine, Oct. 1996, pp. 33-41.

(Continued)

*Primary Examiner*—Chris Kelley
*Assistant Examiner*—Abdias Mondesir
(74) *Attorney, Agent, or Firm*—Donald P. Dinella (57) ABSTRACT

A method for location tracking on a distributed basis using multiple locations, which utilizes a pairwise application of distance constraints and vicinities for determining locations. The location of a particular node is represented by a group of points (as opposed to a single point) defined by the vicinity.

13 Claims, 5 Drawing Sheets

OTHER PUBLICATIONS

Karp, B., Kung, H.T., GPSR: Greedy Perimeter Stateless Routing for Wireless Networks, Proc, of the 6th Annual ACM/IEEE International Conference on Mobile Computing & Networking (MobiCom 2000).

Bulusu, N., Heidemann, J., Estrin, D., USC/Information Sciences Institute, *GPS-less Low Cost Outdoor Localization For Very Small Devices*.

Priyantha, N. B., Chakraborty, A., Balakrishnan, MIT Laboratory for Computer Science, *The Cricket Location-Support System*, MobiCom Aug. 2000, Boston, MA.

Ko, Y-B., Vaidya, N. H., Department of Computer Science, Texas A&M University, *Location-Aided Routing (LAR) in Mobile Ad Hoc Networks*.

* cited by examiner

METHOD FOR LOCATION TRACKING USING VICINITIES

FIELD OF THE INVENTION

The present invention relates generally to location tracking and, more particularly, to a method for tracking the locations of devices in communications networks such as cellular and ad hoc communications networks.

BACKGROUND OF THE INVENTION

Wireless cellular telecommunications systems, wire-line telecommunications systems, and the Internet are well-known examples of so-called fixed infrastructure networks. These types of networks are characterized in part by their use of a fixed infrastructure (e.g., wireless base stations, central offices, local loops, routers and the like) and the ability to leverage a known network topology (e.g., in making routing decisions among network nodes). Despite their many advantages, such fixed networks can be expensive to upgrade and can be uneconomical where the number of users is minimal (see, for example, J. Li et al., "A Scalable Location Service for Geographic Ad Hoc Routing", *Proceedings ACM/IEEE Mobicom,* pp. 120-130, August 2000, which is hereby incorporated by reference). In contrast, well-known ad hoc networks do not utilize a fixed infrastructure instead utilizing a variable infrastructure which changes as a function of the devices coming together to form the particular ad hoc network. As will be appreciated, ad hoc networks offer increased flexibility and decreased fixed investments to implement (see, for example, Li et al., supra).

An important application in either fixed infrastructure networks or ad hoc networks is so-called "location tracking" which is the ability to locate particular devices (e.g., a node) throughout the network. Location tracking arises in several contexts in mobile networking. For example, location-based routing algorithms have been proposed to reduce the amount of data transferred in computing a path in ad hoc networks (see, for example, Y. B. Ko et al., "Location-Aided Routing (LAR) in Mobile Ad hoc Networks", *Proceedings ACM/IEEE Mobicom,* pp. 66-75, October 1998, which is hereby incorporated by reference). Further, well-known cellular applications such as fleet tracking and emergency response systems rely on location information in delivering their respective cellular services. As such, the accuracy of the location information is central to the performance of all these applications whether being delivered via a fixed network or ad hoc network.

There exist a number of well-known location tracking techniques. For example, triangulation is the well-known technique of locating a particular mobile device through the knowledge of the angle of arrival of signals at the to-be-located mobile device from three other devices, where the locations of the three other devices are known. Trilateration is the well-known technique of locating a particular mobile device by determining the distance of the to-be-located mobile device from at least three reference points whose precise location is known. For example, the three reference points might be three other mobile devices in proximity to the to-be-located mobile device. In terms of locating a cellular telephone, two primary forms of trilateration are used in conventional, cellular communications. The first form of trilateration is performed by the cellular network itself using its network infrastructure; in particular, the network uses the known locations of each base station within its infrastructure to locate a particular mobile telephone. Specifically, the location of three known base stations in the same geographic location as the to-be-located mobile telephone is used to determine the relative position of such device. The typical locating precision of this technique is approximately in the range of 50 meters to 300 meters.

The second trilateration form conventionally used in locating a particular mobile telephone device within the cellular communications network employs the well-known Global Positioning System (GPS). GPS is a time-synchronized, space-based satellite system that broadcasts spread spectrum codes and consists of a GPS constellation consisting of 24 individual satellites. A ground-based GPS receiver at or near the object to be located (e.g., the cellular telephone device) determines the difference between the time at which each satellite transmits a particular time signal and the time at which such signal is received. Using the calculated time differentials in standard GPS, the object's location is determined typically to within about 100 meters. This accuracy can be further improved upon by using the well-known commercially available Differential GPS, which improves the GPS location accuracy to within 10 meters.

Still other techniques have been proposed for locating mobile devices in the contexts of indoor ad hoc networks. For example, RADAR (see, P. Bahl et al., "RADAR: An In-Building RF-Based User Location and Tracking System", *IEEE Info Com,* March 2000, which is hereby incorporated by reference) is a well-known technique for tracking indoor environments where a single fingerprint of an entire region is constructed and the location of a particular node is determined based on the signal strength observed at its location. Further, for example, CRICKET (see, N. B. Priyantha et al., "The CRICKET Location-Support System", *ACM MOBICOM,* August 2000, which is hereby incorporated for reference) is another well-known indoor tracking technique where nodes have so-called "listeners" which receive periodic radio and ultrasound signals from base stations in a network. Thereafter, such signals are employed to determine a particular node's location using an estimate of such node's proximity to the base stations. In CRICKET, the objective is to make an association with the closest base station and not to precisely estimate the true position of the mobile node.

In addition to the above-mentioned RADAR and CRICKET techniques, LAR is a reactive routing protocol used in mobile ad hoc networks where all the nodes are aware of their respective locations, see, for example, Y. B. Ko et al., supra. In LAR, the source of a packet session initiates a route request for the destination. This request, in turn, is forwarded by other nodes that lie within a so-called "request region", such request region being computed by the source from the previous known location and velocity of the destination. In the event that a route reply is not received within a specified timeout, LAR either resorts to a global flooding protocol or gradually expands the request region and repeats the discovery process until the route is computed.

Geographic forwarding is a stateless packet forwarding technique employed in large wireless networks, see, for example, J. Li et al., supra; and C. T. Cheng et al., "SLA-LOM: A Scalable Location Management Scheme for Large Scale Mobile Ad hoc Networks", *Proceedings of Wireless Communications and Networking Conference,* March 2002, which is hereby incorporated by reference. In geographic forwarding, nodes are aware of their respective locations and a packet intended for a destination is forwarded to the destination's location by the intermediate nodes. The intermediate nodes forward the packet to a neighbor node that is determined to be the closest to the destination in terms of a Euclidean distance.

Other location-based techniques include using short-range, peer-to-peer communications in combination with the imposition of particular distance constraints between nodes to identify a location of a particular node (see, for example, L. Doherty, "Algorithms for Position and Data Recovery in Wireless Sensor Networks", *Master's Report, University of California Berkeley*, June 2000, which is hereby incorporated by reference). However, Doherty's technique is best suited for centralized execution which presents certain challenges in a distributed network. Another technique detailed in D. Niculescu et al., "Ad hoc Positioning System (APS) Using AOA", *IEEE Infocom*, April 2003, which is hereby incorporated by reference, is directed to a node measuring the angle of arrival of signals from various points (where such points have knowledge about their respective locations) and using triangulation to determine the node's location.

As described above, there exist numerous location-based routing and location information techniques employed in wireless or ad hoc communications networks. Central to the above-described techniques, however, is that they primarily attempt to compute a single point location, which may or may not be the true location. Obviously, if the computed single location is incorrect, that information will adversely impact network performance (e.g., data will be forwarded to incorrect nodes, or data may take extended paths leading to dropped packets). Further, such techniques are primarily directed to centralized execution as opposed to a more distributed execution.

Thus, there exists a need for an enhanced location-based routing technique which addresses multiple locations and provides for distributed execution.

SUMMARY OF THE INVENTION

The present invention provides a method for location tracking on a distributed basis using multiple locations. More particularly, in accordance with an aspect the invention, a pairwise application of distance constraints utilizes so-called vicinities for determining locations. In accordance with an aspect of the invention, vicinities are determined, and used in location tracking, as a function of proximity constraints only. In accordance with an embodiment of the invention, the vicinities of each node in the communications network are initialized as follows: (a) the vicinity of a fixed node (e.g., GPS node) is defined as its current location; and (b) the vicinity of each floating node (e.g., a cellular telephone) is defined as its entire region or full area (i.e., since such floating nodes do not have knowledge of their location at initialization). Further, in accordance with the invention, for a given vicinity $V_x$ an extended vicinity is defined as the points in the given vicinity combined with the points within a distance R of any point in $V_x$. Thus, for each node $N_i$ with vicinity $V_i$, upon such node receiving a broadcast of vicinity $V_j$ from node $N_j$, the vicinity of $N_i$ is updated as the intersection of $V_i$ and the extended vicinity($V_j$, R), where R is the distance between node $N_i$ and node $N_j$. As the vicinity of a node changes such node will broadcast it's updated vicinity to the other neighboring nodes. The vicinity updating continues until such time that the vicinities associated with the respective nodes stop shrinking (i.e., stops reducing in the number of locations within a particular vicinity). In accordance with the various aspects of the invention, the location of a particular node is represented by a group of points (as opposed to a single point) defined by the vicinity.

In accordance with a further aspect of the invention, vicinities are determined, and used in location tracking, as a function of both proximity constraints and non-proximity constraints, in a communications network in accordance with the aspects of the present invention. More particularly, in accordance with this further aspect of the invention, if node $N_i$ is unable to communicate with $N_j$ it can be concluded that node $N_i$ is not within a circle of radius mdr of $N_j$. Thus, if $N_j$ is a floating node then $N_i$ cannot be at any point within a maximum distance range as defined by the particular transmission device (hereinafter referred to as "mdr") from every point in $N_j$'s current vicinity. Therefore, points can be eliminated from $N_i$'s vicinity that do satisfy such a requirement. Again, the location of the particular node, in accordance with the aspects of the invention, is represented by a group of points (as opposed to a single point) defined by the vicinity.

Advantageously, in accordance with the invention, each node has a vicinity, at any point in time, which may be utilized in location tracking and routing in the communications network. Importantly, in accordance with the invention, the location of a particular node is represented by a group of points (as opposed to a single point) defined by the vicinity thereby minimizing the adverse impact of location errors (i.e., as in the single point location techniques) and allowing for a distributed solution. More particularly, the distributed advantage of the invention stems from the fact that each node determines and updates its location (through vicinities) utilizing information local to such node thereby eliminating the need to communicate with a central server for such purposes.

DETAILED DESCRIPTION

The present invention provides a method for location tracking on a distributed basis using multiple locations. To facilitate the understanding of the present invention several terms will first be introduced and discussed in some detail. In accordance with an aspect of the invention, a so-called "vicinity" is defined as the area containing an actual location (e.g., a node). More particularly, as used throughout this disclosure, a vicinity is defined as:

(1) Vicinity. Let $n_i$ be a node in a network in a region R. Then, the vicinity V of $n_i$ is any subset of points in R that contains the actual location of that particular node.

A vicinity, in accordance with the invention, can be a disconnected set of points (i.e., not contiguous points or regions of points) or a bounded area (i.e., contiguous points or regions of points) ranging from a node's exact location to an entire cell area. Further, as used throughout this disclosure, a so-called "feasible vicinity" is a specific vicinity which comprises the locations of a particular node which are present in the so-called "feasible solution set" for a given constraint set. As used throughout this disclosure, a "feasible solution" is defined as:

(2) Feasible Location & Feasible Solution. For a given class(es) of constraints, a feasible solution is any location vector of the nodes ($[l_1, l_2 \ldots l_n]$) that satisfies all of those constraints. In addition, a "feasible set" is the set of all possible feasible solutions.

Thus, for every element in a feasible vicinity there exists a positioning of the other nodes such that the constraints are satisfied. In terms of applying the constraints, as will be appreciated, distance constraints can be defined such that at any given instant a specific distance relationship will hold between each pair of nodes in a network. Two such distance constraints are as follows:

(3) Proximity—If two nodes ($n_i$, $n_j$) can communicate using so-called static radios (i.e., a device can only transmit at a maximum distance range of mdr) they are within a distance of mdr of each other. If they can communicate using dynamic radios (i.e., a device can modify its power to change its transmission range from zero to mdr) where the adjustable distance is defined as d, they are within d of each other. Let dist(a,b) return the Euclidian distance between two locations a and b. Then, $dist(n_i, n_j) \leq x$, where $x=d$ for dynamic radios and mdr for static radios.

(4) Non-proximity—If two nodes ($n_i$, $n_j$) cannot communicate with each other, they are more than mdr away from each other. Then, $dist(n_i, n_j) > mdr$.

As will be appreciated, using the proximity and non-proximity relationships as set forth above, a proximity graph can be constructed with a vertex corresponding to each node in the a given network and an edge between ($n_i$, $n_j$) when they are in proximity (in accordance with definition (3) above).

Figure 1:
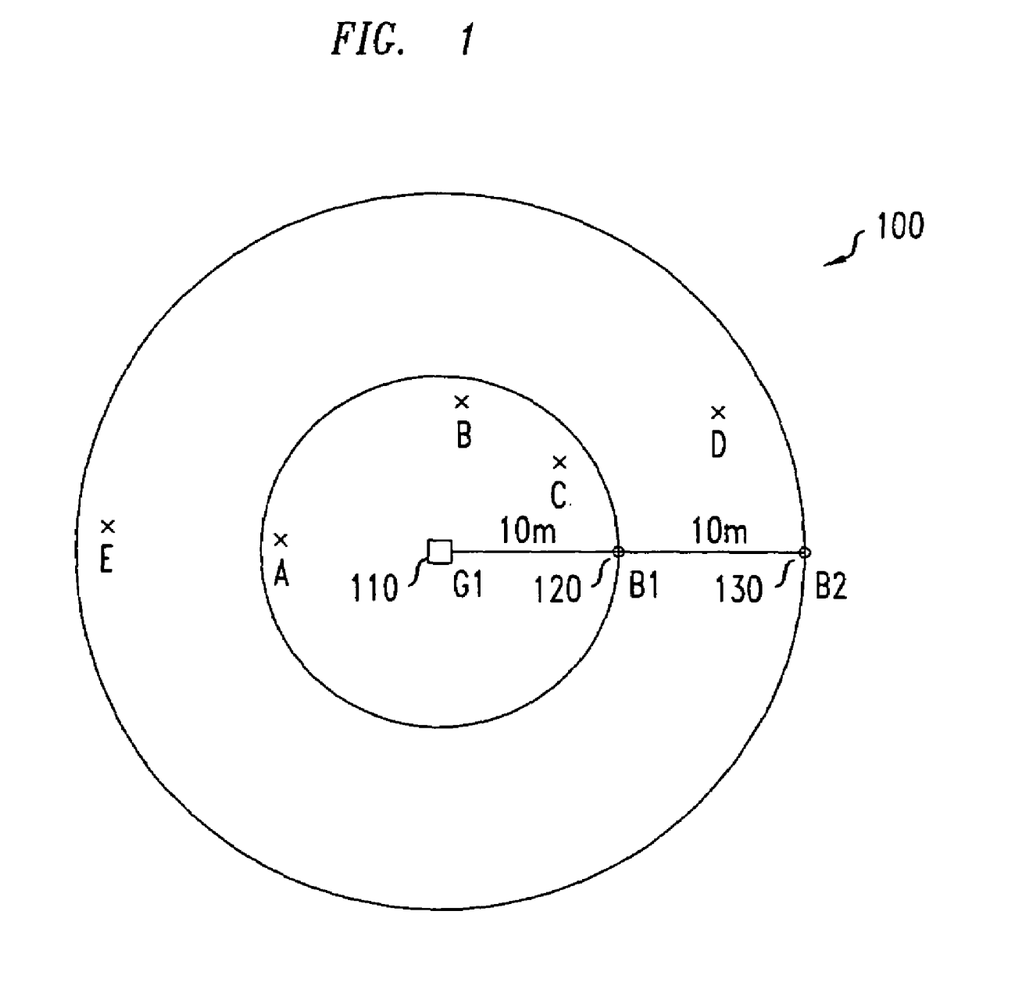
FIG. 1 shows an illustration of proximity and non-proximity distance constraints.

For example, FIG. 1 shows an illustration of proximity and non-proximity distance constraints. More particularly, FIG. 1 shows a network 100 consisting of GPS node $G_1$ 110 and two floating nodes $B_1$ 120 and $B_2$ 130, each such floating node containing a dynamic radio (see definition (3) above) and where the exact location of each node is identified in FIG. 1 by their respective node names. In FIG. 1, the maximum range is illustratively set at 15 m which, in turn, provides for node $B_1$ 120 communicating with the other two nodes (i.e., $G_1$ 110 and $B_2$ 130) while $B_2$ can communicate only with $B_1$. Applying a proximity constraint between $B_1$, $G_1$ it can be shown that $B_1$'s location can only be inside a circle of radius 10 m from $G_1$. Thus, applying the same proximity constraint between $B_1$, $B_2$ it can be shown that $B_1$ must be within a band of 10 m around $B_1$'s possible location which reduces to a circle of 20 m radius around $G_1$. Therefore, vector [$G_1$, C, B] and [$G_1$, C, D] are two possible feasible solutions. Similarly, by applying the non-proximity constraint between $G_1$ and $B_2$ it can be shown that $B_2$ cannot be within a circle of 15 m around $G_1$. In such case, vector [$G_1$, C, B] is not a feasible solution whereas [$G_1$, C, D] is feasible.

Existing location tracking techniques (as described previously) can be generally classified as computing a single feasible solution under proximity constraints (i.e., a so-called "single point solution"). As such, all feasible solutions are equally valid under a given set of constraints such that there exists no guarantee that the chosen solution is closer to the actual location than any other possible location. In such single point solutions, the locations used are a function of a feasible solution computed under a set of constraints. That is, this type of solution is essentially a randomly chosen element of the feasible set. As long as the nodes have not moved, the same locations are used at each invocation to compute distances, path lengths and the like. As a result, if the particular chosen feasible solution is incorrect, the entire network's (or location system) performance is adversely affected.

To address the above, the Applicants herein have realized an improved location tracking technique which, in accordance with the various aspects of the present invention, utilizes multiple feasible solutions such that a randomly chosen feasible solution is employed for each invocation. More particularly, in accordance with an aspect of the invention, multiple location vectors (i.e., multiple feasible solutions are selected on a random basis from the vicinities of other nodes) that are valid under a given set of inter-node distance constraints are utilized for locating a particular location (e.g., a node) in a distributed (as opposed to centralized) fashion.

As introduced above, in accordance with an aspect of the invention, distance constraints are applied to pairs of nodes for computing supersets of feasible vicinities. In particular, given a set of constraints, the vicinities in accordance with this aspect of the invention have the following property:

(5) Consider a location $l_i$ occurring in the vicinity $V_i$ of a node $n_i$. When the proximity constraint is used, for every node $n_i$ there exists a location $l_j$ in the vicinity $V_j$ of $n_j$ such that $l_i$ and $l_j$ are mdr (see definition (3) above). If the non-proximity constraint is used, then for every node $n_j$ that is not a neighbor of $n_i$, there exists at least one location $V_j$ such that $l_i$ and $l_j$ are more than mdr away (see definition (4) above).

Figure 2:
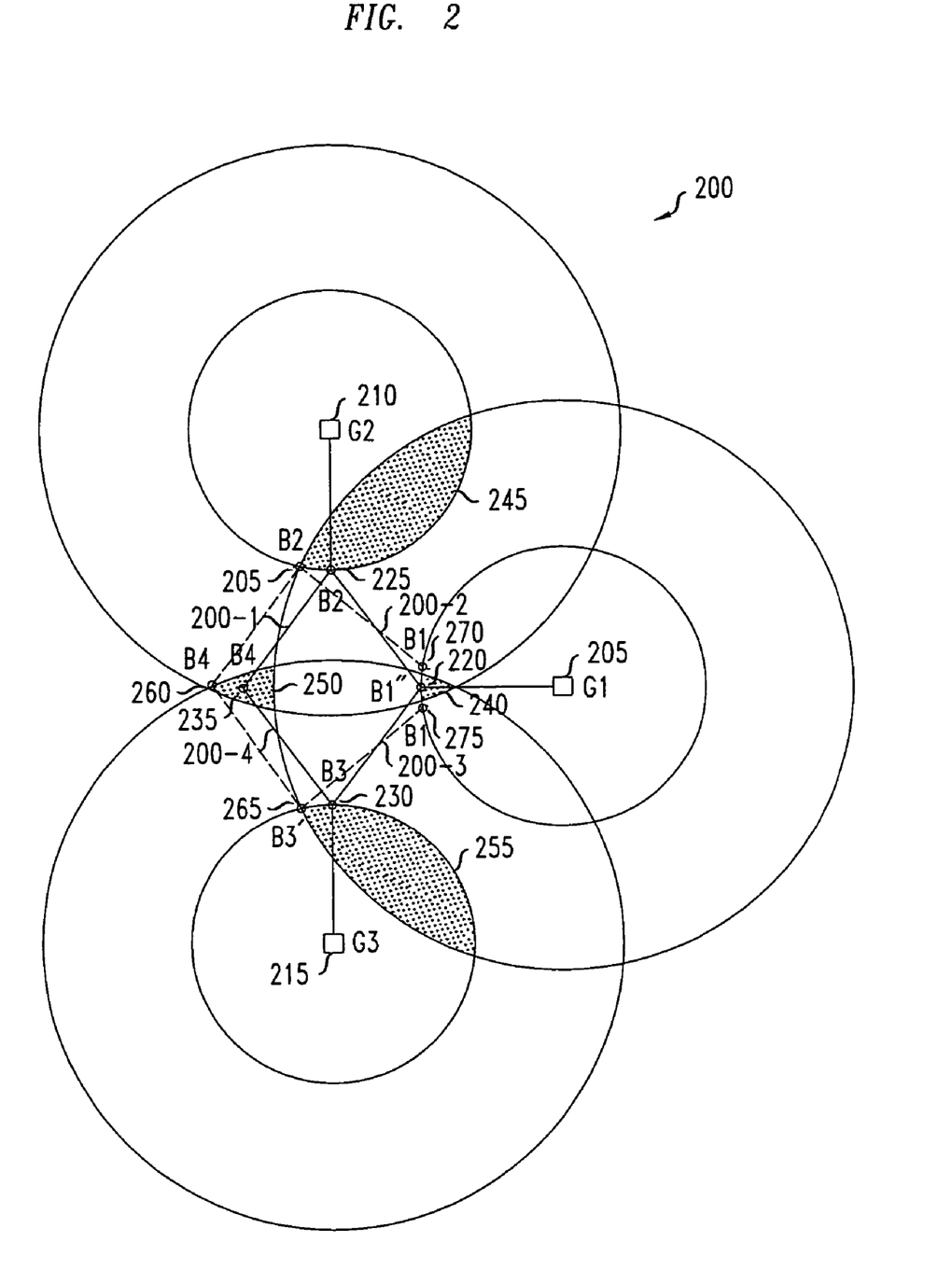
FIG. 2 shows the pairwise application of the distance constraints of FIG. 1 in accordance with the principles of the invention.

The aforementioned aspect of the invention related to the pairwise application of constraints (as opposed to applying all the constraints together) is illustrated in FIG. 2 which shows a region 200 with three GPS nodes ($G_1$ 205, $G_2$ 210 and $G_3$ 215), and four floating nodes ($B_1$ 220, $B_2$ 225, $B_3$ 230 and $B_4$ 235). The edges (200-1, 200-2, 200-3 and 200-4) connecting the four floating nodes are each, illustratively, 10 m in length. The vicinities (vicinity 240, 245, 250 and 255), in accordance with the invention, of these nodes are shown in the shaded regions of FIG. 2. Further, let $B'_4$ 260 be a location chosen from the vicinity 250 of $B_4$ 235. Thus, as shown in FIG. 2, $B'_2$ 205, and $B'_3$ 265 are 10 m from $B'_4$ 260 as determined by applying the principles of the invention. Additionally, the only location in vicinity 240 (i.e., the vicinity of node $B_1$ 220) at a distance of 10 m from $B'_2$ 205 is $B'_1$ 270, and from $B'_3$ 265 is $B'_1$ 275. Therefore, given $B'_1$ 270 and is $B''_1$ 275 are two different points in vicinity 240 there is no feasible solution having $B'_4$ 260 as the possible position of node $B_4$ 235.

Figure 3:
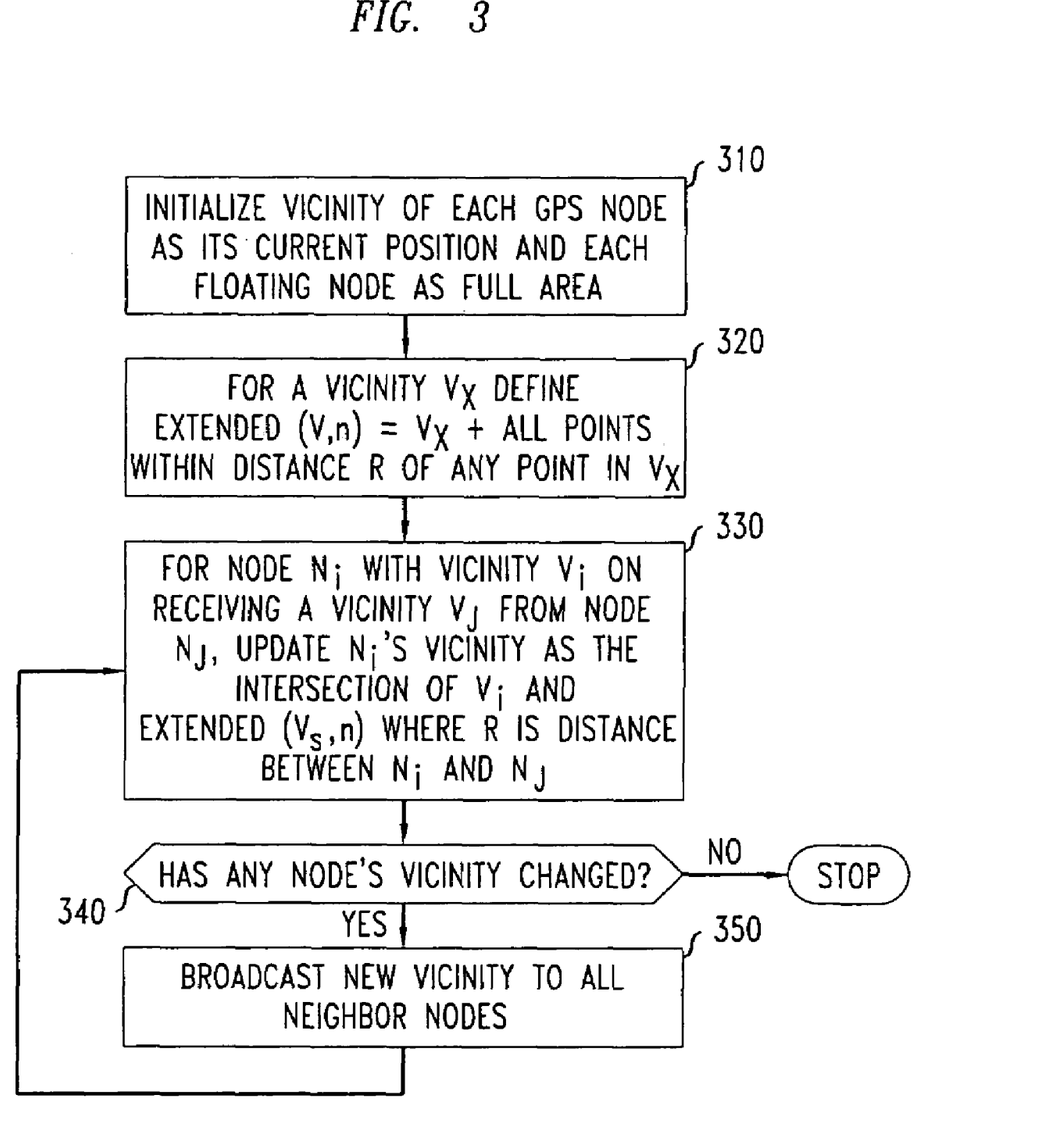
FIG. 3 shows a flowchart of illustrative operations for determining vicinities, as a function of proximity constraints only, in a communications network in accordance with the principles of the present invention.

In accordance with the invention, the pairwise application of constraints are used for determining vicinities. The determination and use of such vicinities in location tracking is a further aspect of the invention. To that end, FIG. 3 shows a flowchart of illustrative operations for determining vicinities, as a function of proximity constraints only, in a communications network in accordance with the principles of the present invention. More particularly, in accordance with this embodiment of the invention, the vicinities of each node in the communications network are initialized (see block 310) as follows: (a) the vicinity of GPS node is defined as its current location; and (b) the vicinity of each floating node is defined as its entire region or full area (i.e., since such floating nodes do not have knowledge of their location at initialization). Further, in accordance with the invention, for a given vicinity $V_x$ an extended vicinity is defined (see, block 320) as the points in the given vicinity combined with the points within a distance R of any point in $V_x$. Thus, for each node $N_i$ with vicinity $V_i$, upon such node receiving a broadcast of vicinity $V_j$ from node $N_j$, the vicinity of $N_i$ is updated as the intersection of $V_i$ and the extended vicinity ($V_j$, R), where R is the distance between node $N_i$ and node $N_j$ (see, block 330). As the vicinity of a node changes (see, block 340) such node will broadcast it's updated vicinity to the other neighboring nodes (see, block 350). Such vicinity updating continues until such time that the vicinities associated with the respective nodes stop shrinking (i.e., stops reducing in the number of locations within a particular vicinity). The reductions in locations and their application in bounding a vicinity determination is described in further detail hereinbelow.

Advantageously, in accordance with the invention, each node has a vicinity, at any point in time, which may be utilized in location tracking and routing in the communications network. Importantly, in accordance with the invention, the location of a particular node is represented by a group of points (as opposed to a single point) defined by the vicinity.

Figure 4:
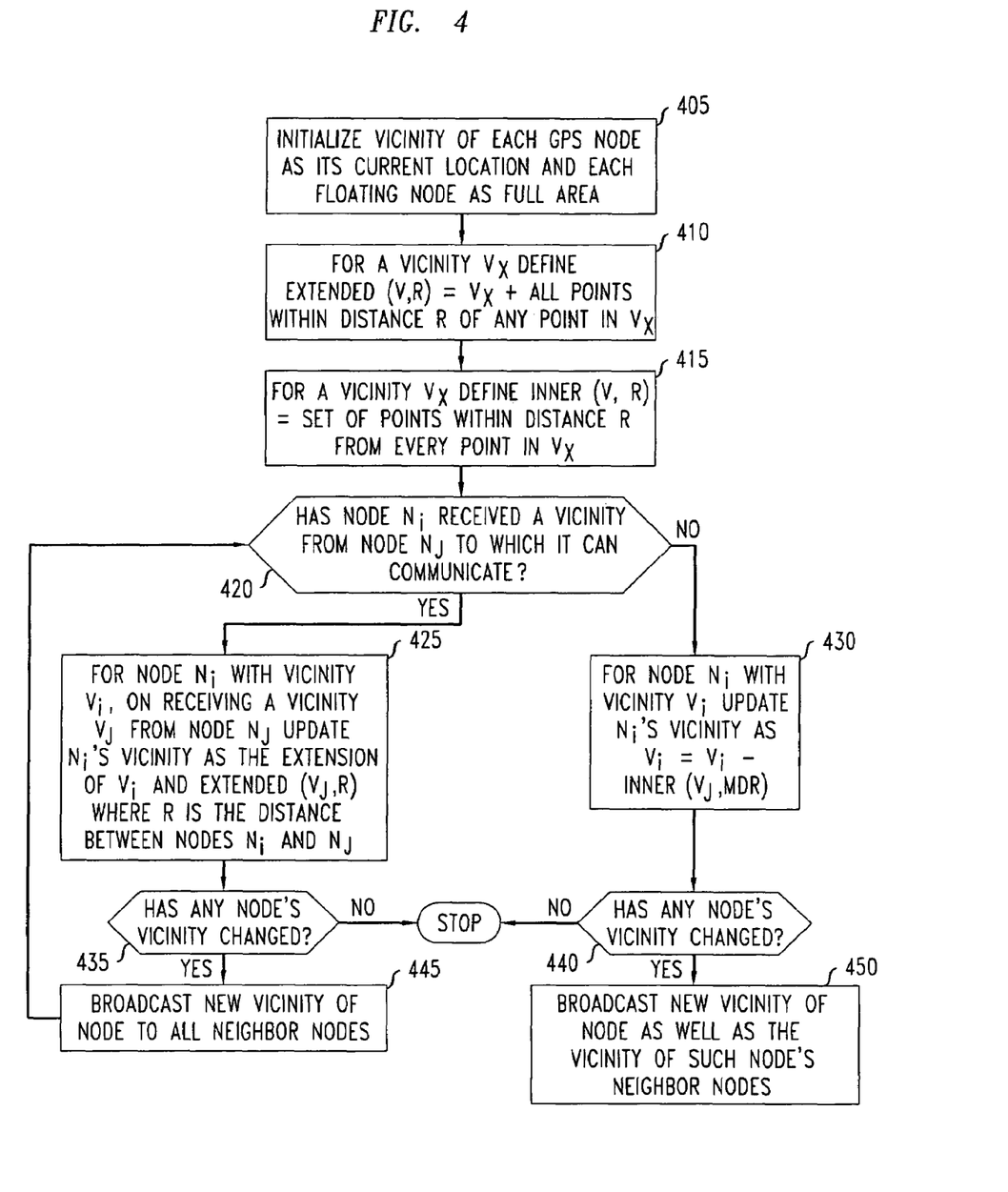
FIG. 4 shows a flowchart of illustrative operations for determining vicinities, as a function of both proximity constraints and non-proximity constraints, in a communications network in accordance with the principles of the present invention.

FIG. 4 shows a flowchart of illustrative operations for determining vicinities, as a function of both proximity constraints and non-proximity constraints, in a communications network in accordance with the principles of the present invention. More particularly, in accordance with this further embodiment of the invention, if node $N_i$ is unable to communicate with $N_j$ it can be concluded that node $N_i$ is not within a circle of radius mdr of $N_j$. Thus, if $N_j$ is a floating node then $N_i$ cannot be at any point within mdr from every point in $N_j$'s current vicinity, therefore, such points can be eliminated from $N_i$'s vicinity. As shown in FIG. 4, initialization (see, block 405) and defining the extended vicinity function (see, block 410) occurs in the same fashion as detailed above with regard to the same operations of FIG. 3. The operation detailed in block 415 defines a certain inner (V,R) function which is directed to applying the non-proximity constraints in the event certain nodes are unable to communicate as described above. In accordance with this embodiment of the invention, a determination is made (see, block 420) as to whether a node $N_i$ receives a vicinity from a node $N_j$ to which it can communicate. If so, the application of proximity constraints are applied (see, blocks 425, 435 and 445, respectively) in the same manner as these same operations are described above with reference to FIG. 3. If such nodes are unable to communicate, non-proximity constraints are applied (see, blocks 430, 440 and 450, respectively).

More particularly, as shown in FIG. 4, node $N_i$'s vicinity is updated (see, block 430) to remove particular points using the function of inner(V,R). Thereafter, in accordance with this embodiment of the invention, the updated vicinity is broadcast (see, block 450) together with the vicinities of all the neighboring nodes of $N_i$. Thus, in accordance with invention, for proximity constraints a node will broadcast only that node's vicinity to the other nodes, and, for non-proximity constraints the node will broadcast the vicinities of its neighboring nodes in addition to its own vicinity.

Figure 5:
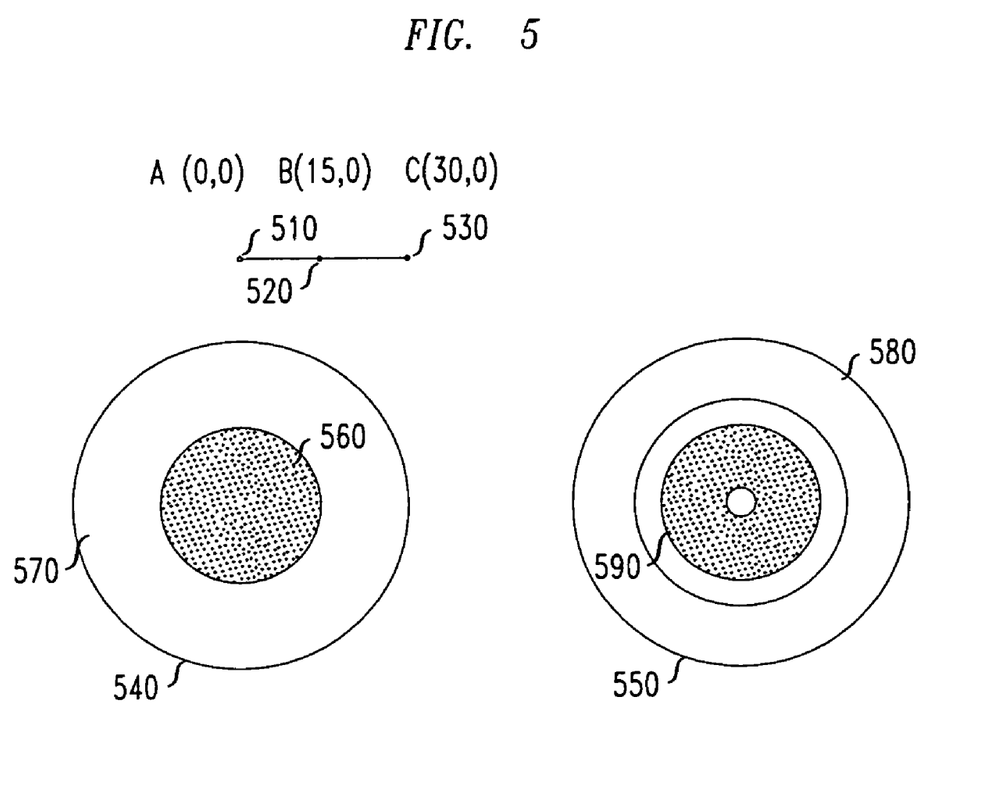
FIG. 5 shows an illustrative location tracking example utilizing the illustrative operations of FIG. 3 and FIG. 4 for determining vicinities in accordance with the principles of the invention.

FIG. 5 shows an illustrative location tracking example utilizing vicinities and the illustrative operations of FIG. 3 and FIG. 4. In particular, consider a region (e.g., a region of a wireless communications network) containing three nodes (A, B, C) at locations (0,0), (15,0) and (30,0) respectively (see, nodes 510, 520 and 530 in FIG. 5), where node 510 is a GPS node and nodes 520 and 530 are floating nodes. Further, let the maximum radio range mdr be 20 m. Proximity graph 540 illustrates the results of applying proximity constraints between the three nodes in accordance with the invention. In particular, as shown in proximity graph 540, node B's vicinity 560 is the set of points within 15 m from node A. Further, the vicinity 570 of node C 530 is the set of points 15 m from the points in node B's vicinity (i.e., a circle of radius 30 around the origin).

Further, proximity graph 550 shows the results of applying the principles of the invention directed to using both the proximity constraints and non-proximity constraints. In particular, node C 530 cannot communicate with node A 510 so it cannot be within a circle of 20 m around node A 510. Therefore, in accordance with the invention, node C's vicinity 580 is determined by eliminating points that within 20 m from node A and such vicinity is reduced to the donut-shaped ring of inner radius 20 and outer radius 30 as shown in proximity graph 550. Interestingly, applying node C's refined vicinity 580 and the proximity constraints between node B and node C, node B's vicinity is further reduced to contain only points that are within 15 m from any point in node C. Therefore any points within a circle of radius 5 m around the origin are eliminated from node B's vicinity 590 due their failure in satisfying the proximity constraint.

As will be appreciated from the illustrative example of FIG. 5, vicinities are represented as sets of locations, and only when the proximity constraint is enforced is there a guarantee that the vicinities will be of convex (e.g., circular) shape. As will be appreciated, a convex set is a set in which every segment which connects points of the set lies entirely within the set. As will be understood, the vicinities determined in accordance with invention may also be represented using boundaries of shapes by employing well-known computer graphic techniques, or by using a bounding box to approximate the vicinities.

As will also be understood, the various aspects of the invention described above involve the performance of a significant amount of data transfers and intersections. Therefore, in accordance with an embodiment of the invention, in recognition that certain data transfers lead to an intersection, the data transferred is viewed as the sole complexity metric. That is, in accordance with this embodiment of the invention, the number of data transfers is a measure of the efficiency of the methodology. Therefore, a reduction of the overall amount of data transferred is achieved by utilizing an off-line schedule derived as a function of the proximity graph to dictate when nodes should broadcast their vicinity. To the end, the Applicants herein have derived the following data rate transfer relationships:

Lemma 1: Consider two neighboring nodes A, B in an acyclic proximity graph whose proximity constraint has already been applied. If the vicinity of one of the nodes is now refined due to external constraints, exactly one intersection is needed to converge the vicinities again.

Proof 1: Let $f_A$ and $f_B$ denote the vicinities A, B, respectively. Let $f_A$ denote the newly modified vicinity which is broadcast to B. B computes a new vicinity $f_B$ by retaining only points that are within mdr of some point in $f_A$. Thus, the new vicinity of B will not assist in any further refining of the vicinity of A. Assuming the contrary, let A refine its vicinity to $f'_A (f'_A \subset f_A)$. Consider a location $l_A$ in $f_A - f'_A$, then by proximity constraint there must be a point $l_B$ in $f_B$ that is within mdr of $l_A$, and $l_B$ must be in $f_B - f'_B$ in order to be removed from $f'_A$. However, since $l_B$ is within mdr of $l_A$ it would have to in $f'_B$, therefore, this contradiction serves as proof that no further refinement of $f_A$ is possible. Thus, the vicinity refinement process, in accordance with the invention, converges with a single intersection occurring at B.

Theorem 1: Given a region consisting of n nodes whose proximity graph is acyclic, there exists a schedule for determining vicinities as a function of proximity constraints only, in accordance with the invention, such that vicinities are computed in $O(n*\log(n))$ time.

Proof 2: Given an acyclic graph of n nodes, the link $l=(n_i, n_j)$ can be located in the proximity graph that divides the acyclic graph into two subgraphs of sizes n' and (n−n') nodes, respectively. Consider the subgraph containing $n_i$ where the vicinity of this node is modified as a function of $n_j$'s new vicinity, and that all the constraints within this subgraph have already been applied thereby making $n_i$ the only node with a modified vicinity. Therefore, in accordance with Lemma 1 as set forth above, only one intersection need be performed to update each of $n_i$'s neighboring nodes in the subgraph. On a recursive basis, all the nodes in the subgraph can be updated in n' intersections, where n' is the number of nodes is such subgraph. Therefore, the run time of these operations is given by the following: $T(n)=T(n')+T(n-n')+(n-n')$, Assuming that $n'=n/2$, $T(N)$ can be determined on a recursive basis as: $T(n)=n*\log(n)$.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for determining a location of a node $N_i$ in a communications network, the communications network having a plurality of nodes, the method comprising the steps of:
    initializing each node of the plurality of nodes with an initial location, the node $N_i$ and a node $N_j$ being part of the plurality of nodes, and the node $N_i$ having a vicinity $V_i$ and the node $N_j$ having a vicinity $V_j$,
    updating, in response to the node $N_i$ receiving a communication of the vicinity $V_j$, the vicinity $V_i$ as a function of the vicinity $V_j$ and a distance R, where R is the distance between the node $N_i$ and node $N_j$; and
    broadcasting the updated vicinity $V_j$ to the plurality of nodes as the location of the node $N_i$ in the communications network,
    wherein the function for updating the vicinity $V_i$ is defined as an intersection of (i) a first set of points associated with the vicinity $V_i$; with (ii) a second set of points associated with the vicinity $V_j$ and any point within the distance R of any point in the vicinity $V_j$.

2. The method of claim 1 wherein the node $N_i$ is a floating node and the node $N_j$ is a GPS node.

3. The method of claim 2 wherein the vicinity $v_i$ is a subset of points in a region of the communications network that contains an actual location of the node $N_i$.

4. The method of claim 1 wherein the plurality of nodes includes only GPS nodes.

5. The method of claim 1 wherein the communications network is an ad hoc network.

6. A method for determining a location of a node $N_i$ in a communications network, the communications network having a plurality of nodes, each of the nodes having a vicinity, the method comprising the steps of:
    initializing each node of the plurality of nodes with an initial location, the node $N_i$ and a node $N_j$ being part of the plurality of nodes) and the node $N_i$ having a vicinity $V_i$ and the node $N_j$ having a vicinity $V_j$;
    receiving, at the node $N_i$, a communication of the vicinity $V_j$;
    determining whether the node $N_i$ and the node $N_j$ can communicate with each other and
    (i) if so, updating the vicinity $V_i$ as a function of the vicinity $V_j$ and a distance R1, where R1 is the distance between the node $N_i$ and node $N_j$, and the function for the updating the vicinity $V_i$ is defined as an intersection of (a) a first set of points associated with the vicinity $V_i$; with (b) a second set of points associated with the vicinity $V_j$ and any point within the distance R1 of any point in the vicinity $V_j$; and
    broadcasting the updated vicinity $V_i$ to the plurality of nodes as the location of the node $N_i$ in the communications network; or
    (ii) if not, updating the vicinity $V_i$ as a function of the vicinity $V_j$ and a distance R2, where R2 is a maximum distance range (mdr), and the function for the updating the vicinity $V_i$ is defined by removing a first set of points associated with the vicinity $V_j$ from a second set of points associated with the vicinity $V_i$; and
    broadcasting the updated vicinity $V_i$ to the plurality of nodes as the location of the node $N_i$ in the communications network together with the vicinity of each of the other nodes in the plurality of nodes.

7. The method of claim 6 wherein the node $N_i$ is a floating node and the node $N_j$ is a GPS node.

8. The method of claim 6 wherein the vicinity associated with each of the node is a subset of points in a region of the communications network that contains an actual location of the node.

9. The method of claim 8 wherein the communications network is a mobile network.

10. The method of claim 7 wherein the first set of points is within a distance equal to the mdr of all points in the vicinity $V_j$.

11. The method of claim 8 wherein the subset of points of the vicinity is minimized by performing the respective updating operations on a recursive basis.

12. The method of claim 6 wherein the plurality of nodes includes only GPS nodes.

13. The method of claim 10 wherein the mdr is determined as a function of the floating node's transmission characteristics.

* * * * *